US008670554B2

(12) United States Patent
Mukund

(10) Patent No.: US 8,670,554 B2
(45) Date of Patent: Mar. 11, 2014

(54) METHOD FOR ENCODING MULTIPLE MICROPHONE SIGNALS INTO A SOURCE-SEPARABLE AUDIO SIGNAL FOR NETWORK TRANSMISSION AND AN APPARATUS FOR DIRECTED SOURCE SEPARATION

(75) Inventor: Shridhar K. Mukund, San Jose, CA (US)

(73) Assignee: Aurenta Inc., San Jose, CA (US)

(*) Notice: Subject to any disclaimer, the term of this patent is extended or adjusted under 35 U.S.C. 154(b) by 0 days.

(21) Appl. No.: 13/452,550

(22) Filed: Apr. 20, 2012

(65) Prior Publication Data

US 2012/0269332 A1 Oct. 25, 2012

Related U.S. Application Data

(60) Provisional application No. 61/477,573, filed on Apr. 20, 2011, provisional application No. 61/486,088, filed on May 13, 2011.

(51) Int. Cl.

| | |
|---|---|
| ***H04M 9/08*** | (2006.01) |
| ***H04B 15/00*** | (2006.01) |
| ***G06F 15/00*** | (2006.01) |
| ***G10L 21/00*** | (2013.01) |
| ***G10L 15/00*** | (2013.01) |

(52) U.S. Cl.

USPC ............ 379/406.01; 379/406.03; 379/406.06; 381/94.1; 704/200; 704/226; 704/246

(58) Field of Classification Search

USPC ............ 379/201.06, 406.01, 406.03, 406.06, 379/406.02; 381/92, 61, 94.1; 704/226, 704/231, 246, 200

See application file for complete search history.

(56) References Cited

U.S. PATENT DOCUMENTS

2005/0281410 A1* 12/2005 Grosvenor et al. ............ 381/61
2009/0055170 A1* 2/2009 Nagahama .................... 704/226

* cited by examiner

*Primary Examiner* — Thjuan K Addy

(74) *Attorney, Agent, or Firm* — Womble Carlyle Sandridge & Rice LLP

(57) ABSTRACT

A method is provided for encoding multiple microphone signals into a composite source-separable audio (SSA) signal, conducive for transmission over a voice network. The embodiments enable the processing of source separation of the target voice signal from its ambient sound to be performed at any point in the voice communication network, including the internet cloud. A multiplicity of processing is possible over the SSA signal, based on the intended voice application. The level of processing is adapted with the availability of the processing power at the chosen processing node in the network in one embodiment. An apparatus for separating out the target source voice from its ambient sound is also provided. The apparatus includes a directed source separation (DSS) unit, which processes the two virtual microphone signals in the SSA representation, to generate a new SSA signal including the enhanced target voice and the enhanced ambient noise.

7 Claims, 9 Drawing Sheets

METHOD FOR ENCODING MULTIPLE MICROPHONE SIGNALS INTO A SOURCE-SEPARABLE AUDIO SIGNAL FOR NETWORK TRANSMISSION AND AN APPARATUS FOR DIRECTED SOURCE SEPARATION

CROSS REFERENCE TO RELATED APPLICATIONS

This application claims priority to U.S. patent application Ser. No. 61/477,573, filed Apr. 20, 2011, and entitled "METHOD FOR ENCODING MULTIPLE MICROPHONE SIGNALS INTO A SOURCE-SEPARABLE AUDIO SIGNAL FOR NETWORK TRANSMISSION AND AN APPARATUS FOR DIRECTED SOURCE SEPARATION OF TARGET SOURCE VOICE FROM AMBIENT SOUND"; and U.S. Application No. 61/486,088, filed on May 13, 2011, and entitled "MULTI-MICROPHONE NOISE SUPPRESSION OVER SINGLE AUDIO CHANNEL," which are incorporated herein by reference.

BACKGROUND

Recent developments in the art of manufacturing has brought significant reduction in cost and form factor of mobile consumer devices—tablet, blue tooth headset, net book, net TV etc. As a result, there is an explosive growth in consumption of these consumer devices. Besides communication applications such as voice and video telephony, voice driven machine applications are becoming increasing popular as well. Voice based machine applications include voice driven automated attendants, command recognition, speech recognition, voice based search engine, networked games and such. Video conferencing and other display oriented applications require the user to watch the screen from a hand-held distance. In the hand-held mode, the signal to noise ratio of the desired voice signal at the microphone is severely degraded, both due to the exposure to ambient noise and the exposure to loud acoustic echo feedback from the loudspeakers in close proximity. This is further exacerbated by the fact that voice driven applications and improved voice communications require wide band voice.

A few examples of the devices which benefit from this invention are shown in FIG. 1. These examples include audio hosts 010 and audio accessory 011 headset. They typically contain a microphone 013. The look direction of the targeted voice source 014, is typically known a priori as depicted. The interfering noise sources, henceforth collectively called ambient noise 015, arrive from directions other than the look direction. For the purposes of describing the current invention, the acoustic echo 016 generated by the loudspeakers 019 shall also be treated as ambient noise. The loudspeakers 019 are placed such that the echo arrives from a direction which is generally orthogonal to the said look direction.

The said voice sensing problem due to the reduced signal to noise ratio can be addressed by employing multiple microphones. As shown in FIG. 2, some recent devices have started introducing a second microphone, i.e. 2 MIC array 021, which forms either an end-fire or a broadside beam in the desired look direction. These rudimentary beam forming solutions have several disadvantages. For instance, they introduce frequency distortion, since the beam angular response is frequency dependant.

An alternate method called blind source separation (BSS) has been discussed in the academia. Given two microphones placed in strategic locations with respect to two sources of sound, it is possible to separate out the two sources without any distortion. As shown in FIG. 3, the first microphone 031 is placed close to the first sound source 032, capturing a first sound mixture 033 predominated by the first sound source. Similarly the second microphone 034 is placed in the proximity of the second source 305, generating a sound mixture 036 predominated by the second source. The source separation unit 037 generates two outputs 038, separating the two sound sources with little or no distortion. However, in the real world, it is not practical to place a microphone close to the ambient noise, but away from the target voice.

It is within this context that the embodiments arise.

SUMMARY

The embodiments provide a technique for transforming the outputs of multiple microphones into a source separable audio signal, whose format is independent of the number of microphones. The signal may flow from end to end in the network and processing functions may be performed at any point in the network, including the cloud. The value functions attainable with multi-microphone processing include but are not limited to:

1. Noise Suppression: Enhancement of target voice signal in the presence of ambient noise.
2. Echo Cancellation: Enhancement of target voice signal in the presence of loud acoustic echo from loudspeakers.
3. Voice Suppression: Some applications need ambient noise to be enhanced and the primary voice suppressed. For example, ambient noise may be used to locate and guide the talker in an environment like a shopping mall.
4. Speaker position tracking: Determining the location of the primary voice source.
5. Voice/Command Recognition: Enhancing target voice signal to facilitate recognition. The preferred enhancement processing is different for machine recognition from that for human hearing intelligibility.

In the present embodiments, an arbitrary number of microphones are bifurcated into two groups. The microphones in each group are summed together to form two microphone arrays. Due to the computing ease of the processing operation, i.e., summing, these arrays by themselves provide very little improvement of signal to noise ratio in the desired look direction. However, the microphones are arranged such that the characteristics of the ambient noise from other directions orthogonal to the look direction, is substantially different between the outputs of the two microphone arrays. The embodiments employ a source separation adaptive filtering process between these two outputs to generate the desired signal with substantially improved signal to noise ratio. The separation process also provides ambient noise with significantly reduced voice. There are applications where the ambient noise is of use. The outputs of a multiplicity of microphones is reduced or encoded into two signals, i.e., the virtual microphones. With the reduced bandwidth and fixed signal dimension, it is easier to perform the processing through existing hardware and software systems, such that the processing of interest may be performed either on the end hosts or the network cloud.

The above summary does not include all aspects of the present invention. The invention includes all systems and methods disclosed in the Detailed Description below and particularly pointed out in the claims.

BRIEF DESCRIPTION OF THE DRAWINGS

The embodiments of the invention are illustrated by way of examples and not be interpreted by way of limitation in the accompanying drawings.

DETAILED DESCRIPTION

While several details are set forth, it is understood that some embodiments of the invention may be practiced without these details. In some instances, well-known circuits and techniques have not been shown in detail so as not to obscure the understanding of this description.

As mentioned above two microphones in the beam forming array may provide some mitigation, however, it is possible to do much better with more than two microphones. Increasing the number of microphones brings several scaling hurdles with it, such as:

1. Hardware Hurdle: The standard stereo audio jacks do not support more than two channels. There is also the cost of wiring and the need for multiple channel codec.
2. Bandwidth Hurdle: Wireless connectivity such as Bluetooth and digital enhanced cordless telecommunication (DECT) do not support more than two channels. Also, this is expensive to route more than two audio channels over the internet.

3. Processing Hurdle: The availability of processing power on small form-factor devices is limited due to the battery life constraint.

With advances in server technology, the processing hurdle may be overcome by moving processing to the cloud, making the consumer clients thinner and lighter. With the advent of personal WiFi routers connected to the internet via 3G/4G cellular network, it is becoming more and more feasible to defer voice processing to the cloud.

To overcome the hardware and bandwidth hurdle, it is desirable to reduce the outputs of multiple microphones into a signal, whose required bandwidth does not increase with the increase in the number of microphones. This reduction or encoding should be achievable using hardware circuitry, such as a summer. The encoding needs to preserve the useful information from multiple microphones with respect to the applications mentioned herein which benefit from the use of multiple microphones.

Figure 1:
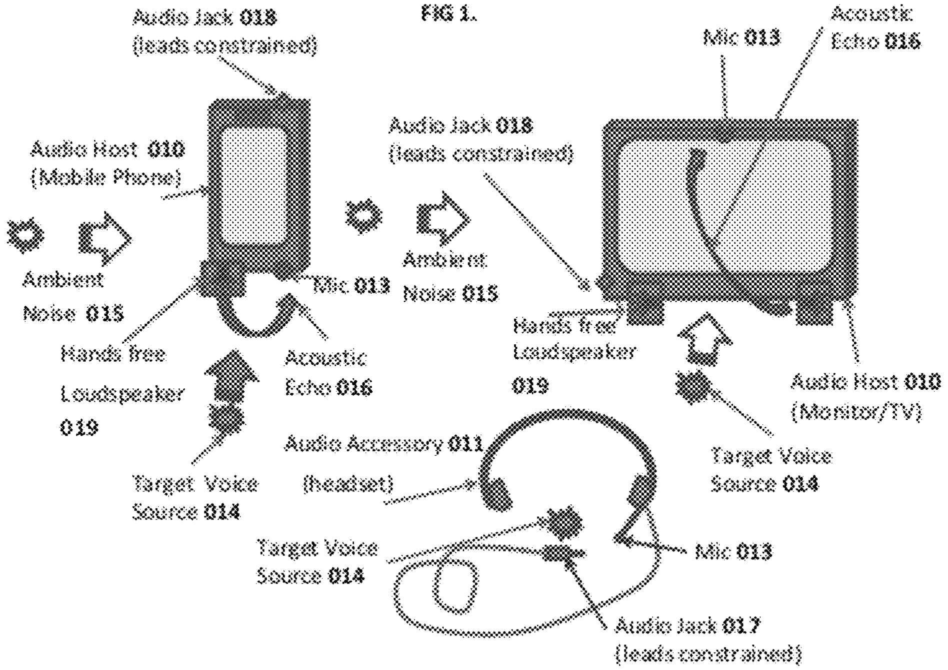
FIG. 1 describes the use case scenarios, where a single microphone is not able to deal well with ambient noise and acoustic echo.
Figure 2:
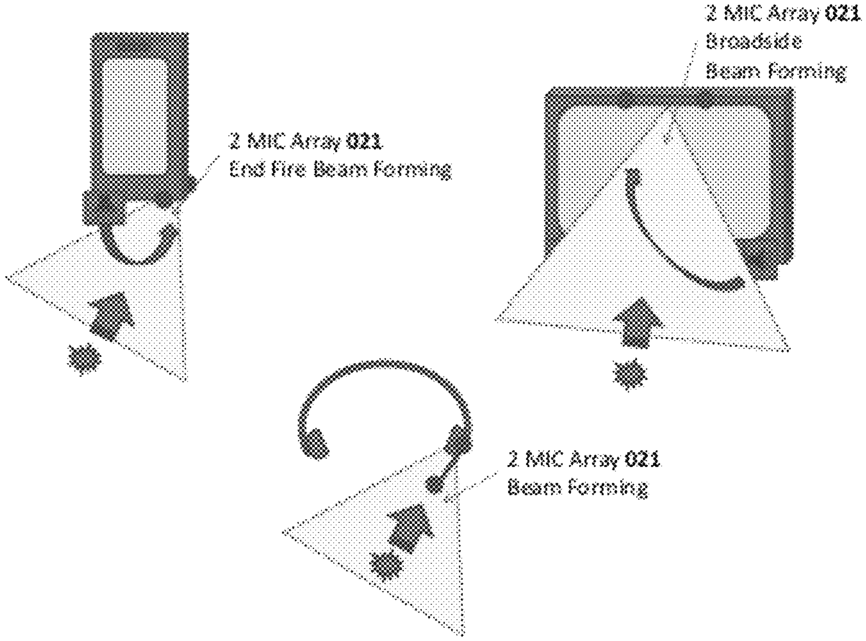
FIG. 2 illustrates the use of a second microphone and associated beam forming to mitigate the ambient noise and acoustic echo.
Figure 3:
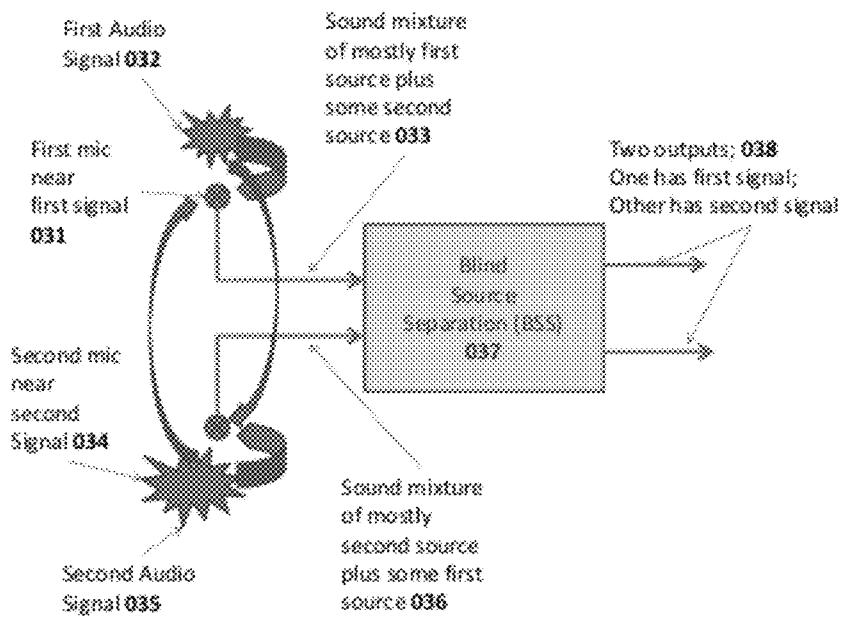
FIG. 3 reviews the concept of blind source separation (BSS).
Figure 4A:
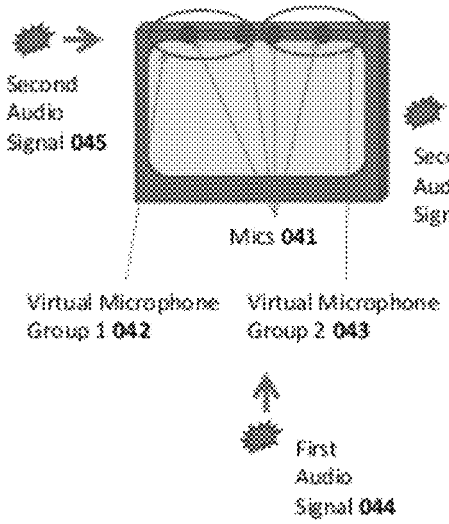
FIGS. 4A and 4B illustrate the concept of a virtual microphone for an exemplary tablet computer in accordance with one embodiment.
Figure 4B:
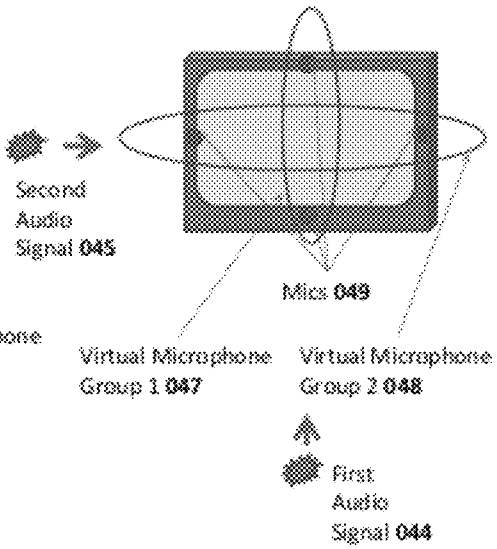
Figure 5:
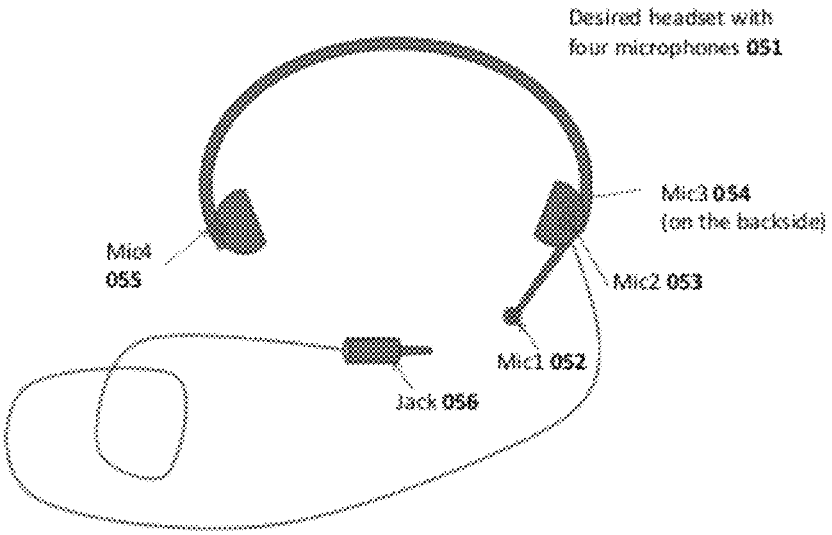
FIG. 5 and FIG. 6 illustrate the concept of virtual microphone for an exemplary binaural headset in accordance with one embodiment.
Figure 6:
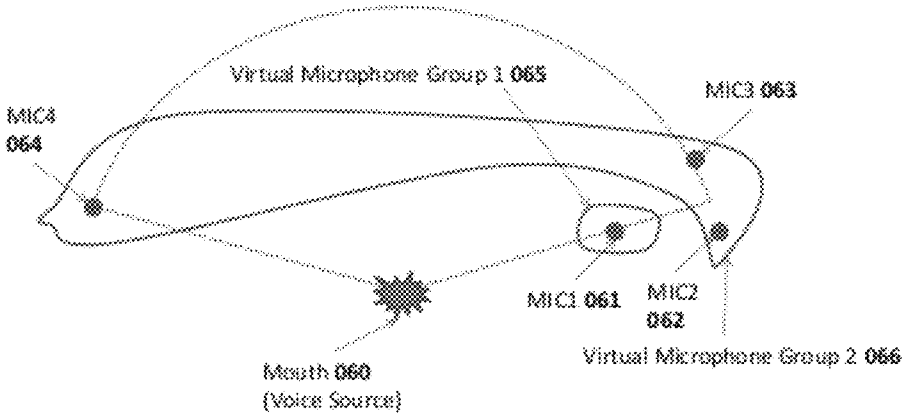

In the embodiments described above, a plurality of microphones is bifurcated into two groups. FIGS. 4A and 4B, depicts two such groupings for the use case of a tablet computer or a net TV. In FIG. 4A microphones 041 are positioned to assume the need to discriminate target voice from ambient noise along the horizontal direction. In FIG. 4B microphones 049 are positioned to assume that the target voice needs to be discriminated from ambient noise along both horizontal and vertical directions. In both these cases, the preferred direction of the target voice is perpendicular to the device. However, the voice source could itself be moving in the vicinity of the preferred direction. The algorithm adapts dynamically to the changing angles of incidence of target voice. As can be seen, the microphone groupings are organized to be roughly symmetrical with respect to the preferred angle of incidence of the target voice. The summed outputs of the microphones in each of the groups are called virtual microphone 1 (042 and 047, respectively) and virtual microphone 2 (043 and 048, respectively). For a second embodiment of the invention, consider four microphones placed on a wired headset 051, as illustrated in FIG. 5 and FIG. 6. The microphones are bifurcated into two groups, namely virtual microphone group 1, 065 (microphone 052) and virtual microphone group 2, 064 (microphones 053, 054 and 055).

Figure 7:
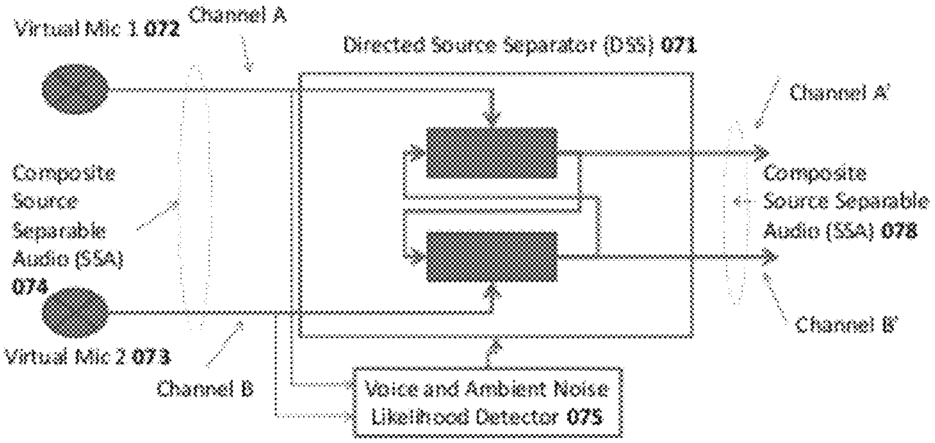
FIG. 7 depicts the block schematic representation of the directed source separation (DSS) processing in accordance with one embodiment.

In all the above cases, the impact of target voice from the desired look direction is similar on both the virtual microphones. The impact of ambient noise is relatively dissimilar on the two virtual microphones. A shown in FIG. 7, the outputs of the two virtual microphones, 072 and 073, are bundled together into one entity, i.e., the composite Source Separable Audio (SSA). The dissimilarity between the two virtual microphones is exploited by block 075, to generate control signals indicating the presence, or likelihood, of target voice and ambient noise. The control signals indicate the instantaneous signal-to-noise ratio between target voice and ambient noise. The cross coupled Directed Source Separator (DSS), 071, directed by the control signals is used to separate out the target voice signal into the output Channel A' and the ambient noise into Channel B', collectively the output SSA, 078. There are several algorithmic approaches to source separation (often referred in literature as Blind Source Separation (BSS)).

Figure 8:
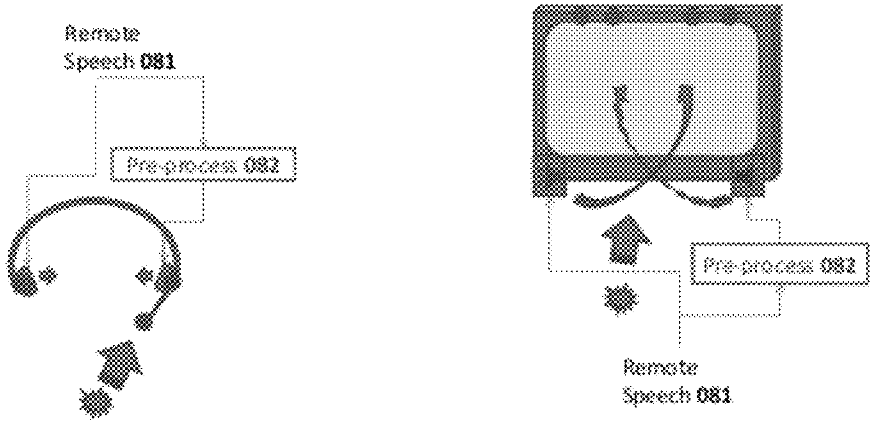
FIG. 8. illustrates the concept of loudspeaker signal preprocessing to further facilitate DSS for acoustic echo suppression in accordance with one embodiment.

In another embodiment, the acoustic feedback from loud speakers is treated as another source of ambient noise. The plurality of microphones are placed and grouped in such a fashion that the acoustic feedback has maximally disparate impact on the two virtual microphones. In one embodiment, as shown in pre-processing module 82 in FIG. 8, the maximum disparity is achieved by pre-processing the loudspeaker channels to maximize the disparity between the acoustic outputs, while minimizing the artifacts audible to the listener. There are several pre-processing techniques to achieve the disparity. Inversion of a portion of the signal between the two channels, introducing phase difference between the two channels, and injection of a small amount of dissimilar white noise in the two channels, are exemplary pre-processing techniques to achieve the disparity.

Figure 9:
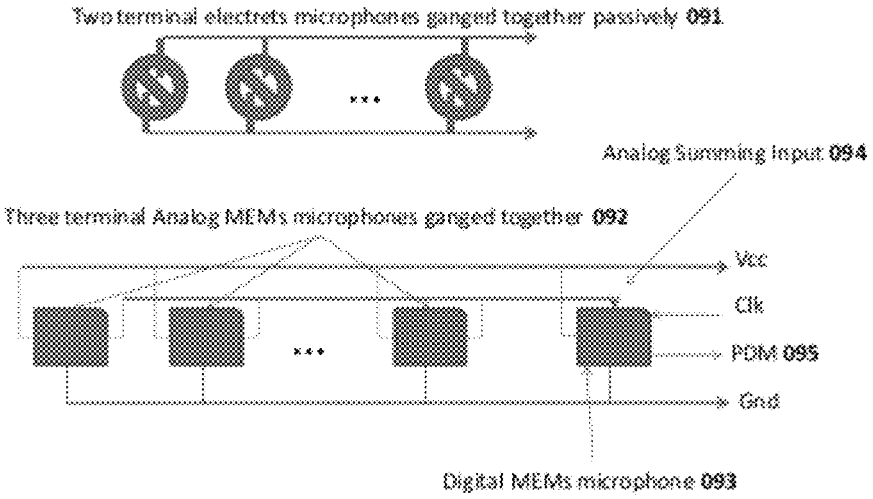
FIG. 9 illustrates the simplification of connectivity introduced by this invention in harnessing the benefits of a multiplicity of microphones in accordance with one embodiment.

One aspect of the embodiments is the ability of simplify the hardware requirement for grouping multiple microphones into a virtual microphone. One embodiment is to passively gang or wire-sum the outputs of analog microphones, 091, as shown in FIG. 9. For example, the two terminal and three terminal electret microphones are connected in parallel to generate the virtual microphone output. Similarly, a three terminal silicon or micro electrical mechanical (MEMS) microphone is also connected in parallel. In another embodiment, for the case of a digital microphone interface, where a digital pulse digital modulation (PDM) signal is required, a plurality of analog MEMS microphone can be ganged together, 092; the output of which is fed to an analog summing input of a digital MEMS microphone, 093. Then the digital PDM output 095 will represent the output of the virtual microphone. In an alternate embodiment, it is also possible to connect multiple digital MEMS microphone by providing a circuitry to interleave the PDM outputs of the plurality of digital microphones. This multiplexer circuitry may be distributed in a modular fashion in all the component digital microphones, so they can be daisy chained together.

Figure 10:
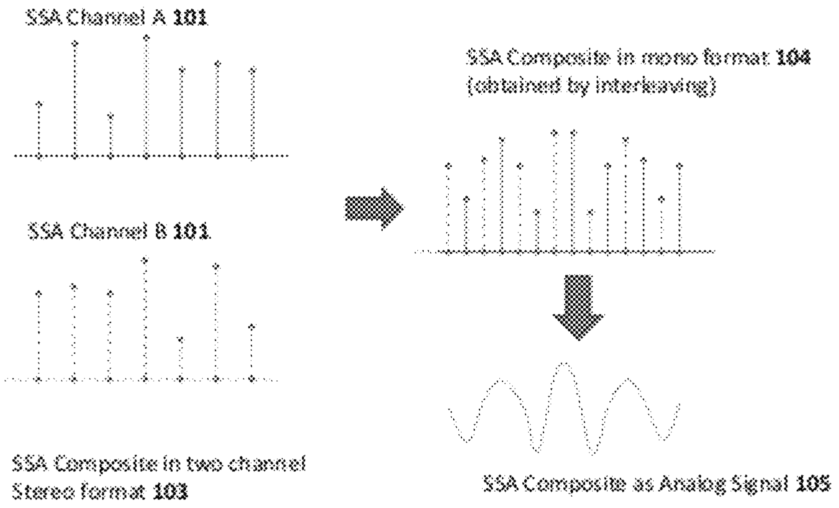
FIG. 10 shows the different representations of the SSA signal in accordance with one embodiment.
Figure 11:
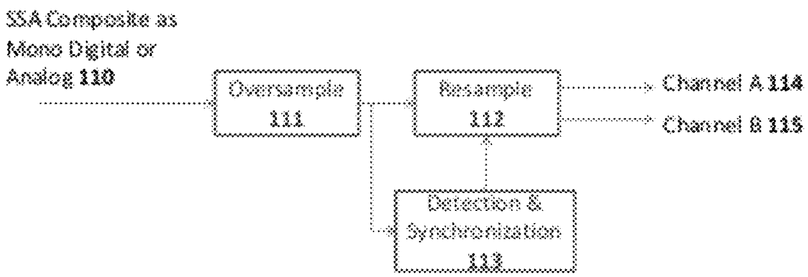
FIG. 11 shows how a mono SSA signal can be converted back to composite (stereo) SSA in accordance with one embodiment.

Logically, SSA is a composite or a bundle of two audio streams, Channel A and Channel B. As shown in FIG. 10, SSA may be represented as stereo, 103, in a system which supports streaming of stereo audio. Alternatively, in a system which only supports mono, the two channels may be interleaved, 104, to create a mono stream of twice the original sampling rate. In another embodiment, the SSA signal may also be converted to a mono analog SSA signal 105, by converting the mono digital SSA 104, to analog. As shown in FIG. 11, a method is provided by which an analog audio signal of the type SSA can be detected. This is done by detecting if a target voice is panned almost similarly in the two channels. In the case of mono digital, or analog, an oversampling operation 111 is executed, clock recovery synchronization is performed, 113, and resampling 112 is executed to extract the two constituent channels.

Figure 12:
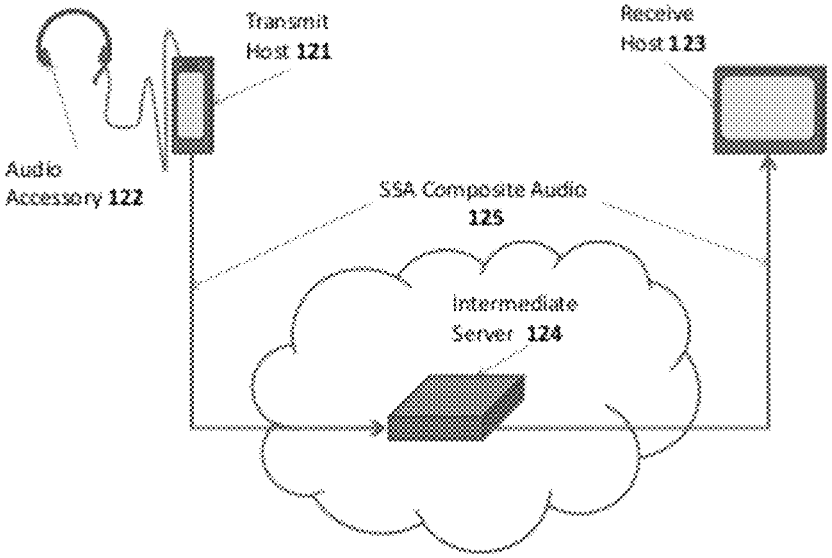
FIG. 12 depicts the flow of the SSA signal through the network in accordance with one embodiment.

In another embodiment, the SSA signal may be transmitted end to end, i.e., from the plurality of microphones on the transmit end to the receiving end, through the voice communication network. Along the way, the SSA signal may be transmitted using the two channel stereo format or the mono audio format. The SSA format is such that the intermediate processing is optional. In others words, the SSA signal degenerates gracefully to a voice signal (with ambient noise) in the absence of any DSS processing. The SSA composite is agnostic to the existing voice communication network, requiring no change at the system level. The SSA composite works with any existing voice communication standard, including bluetooth and voice over Internet Protocol (VoIP). When the DSS signal processing needs to be performed, it can be done so at any point in the network shown in FIG. 12, including the audio accessory 122, transmit host 121, the intermediate server 124, in the internet cloud or the receiving host 123. The DSS processing may be performed at a quality level consistent with the availability of the processing power in the chosen processing node in the network.

Figure 17:
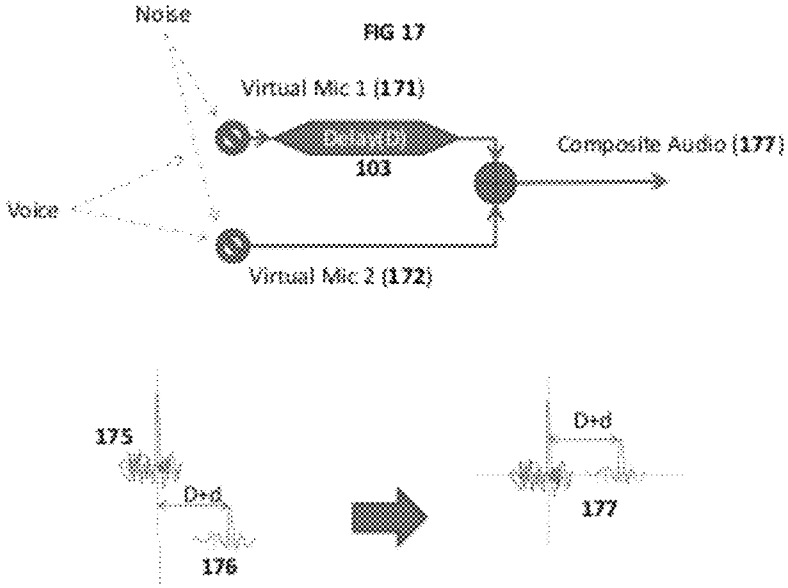
FIG. 17 depicts the process by which a composite audio signal is generated in accordance with one embodiment.
Figure 18:
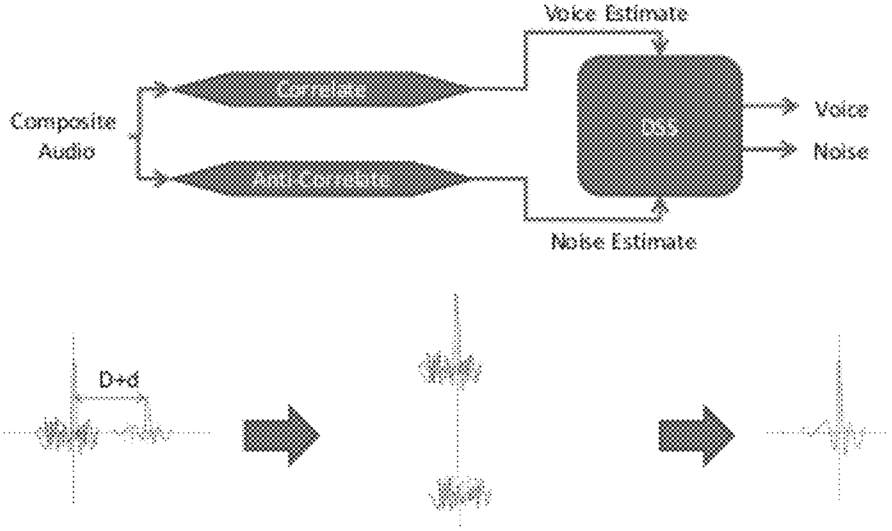
FIG. 18 depicts the use of a statistical signal processing technique for generating a noise estimate from the composite audio signal for performing the required voice and noise separation in accordance with one embodiment.

In another embodiment, where the inputs from the two virtual microphones are analog, an analog SSA signal is generated as shown in FIG. 17. The first audio signal (175) captured by the virtual microphone 1 (171) is an independent mixture of voice and noise, relative to the second audio signal (176) captured by the virtual microphone 2 (172). For example, there may be a built-in delay 173 of d between the voice signals arriving at the two virtual microphones. In the present embodiment, the second audio signal (176) is delayed by D and then summed with the signal 175, to generate the composite analog SSA (177). The delay D is chosen to be large enough, so the autocorrelation of the voice (speech) signal is sufficiently small. The directed separation process (DSS) to revert the SSA signal (181) into its constituents is shown in FIG. 18. With the delay D known a priori, a correlation process results in the voice estimate (182) and an anti-correlation process into a noise estimate (183). The estimates are then run through a directed source separation process to generate enhanced voice (184) and enhanced ambient noise (185).

In another embodiment, it is possible for the receiving end to recover the ambient noise, while suppressing the primary source voice. For example, it may be socially interesting for the receiving listener to experience the party ambience around the transmitting talker. The ambient noise may be used by an application to determine the proximity of two talkers in one embodiment. In another example, an internal map of a shopping mall may be annotated with the ambient noise in several critical spots such as shops, to guide a phone user in reaching their target destination.

Figure 13:
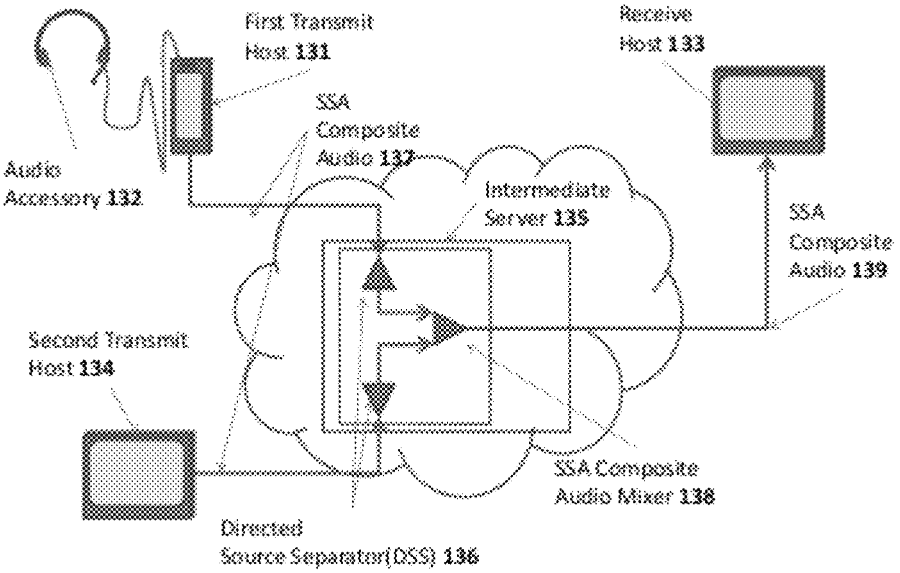
FIG. 13 shows that multiple SSA signals may be mixed for voice conferencing in accordance with one embodiment.

In another embodiment, the SSA representation enables effective processing required for audio conferencing, as illustrated in FIG. 13. The DSS signal processing 136 is performed on two of the transmit host SSA signals 137 and then mixed together, 138, component by component to realize an output SSA signal for the host 139. A similar processing path is provided for generating the outputs required for the hosts 131 and 134.

Figure 14:
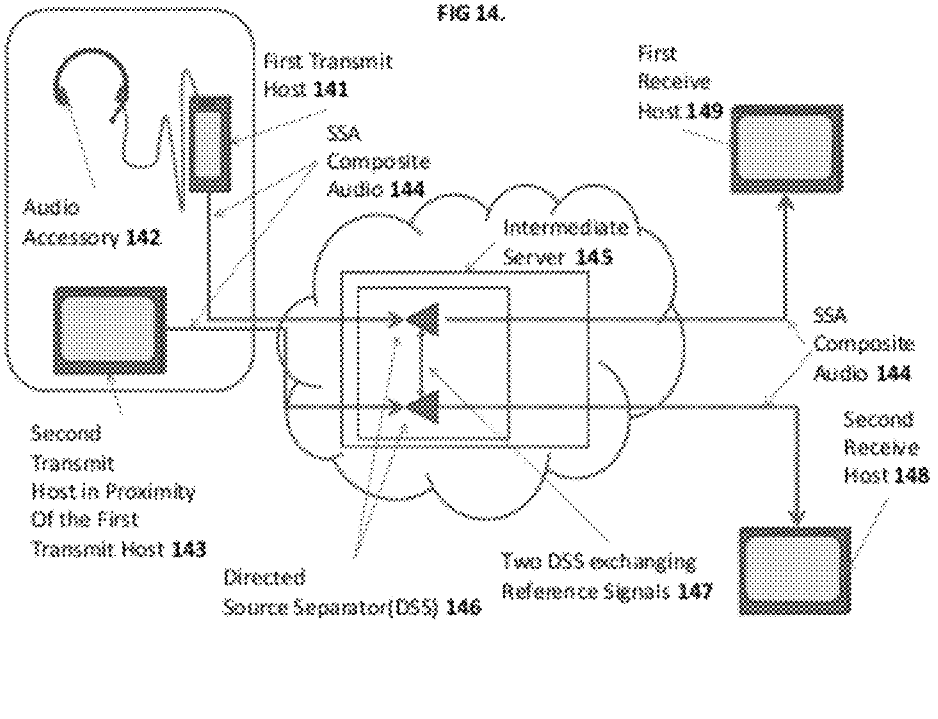
FIG. 14 shows an application where two independent calls can benefit from SSA in accordance with one embodiment.

In another embodiment, the signal processing on a primary call is enhanced by taking advantage of the reference ambient sound present in another secondary call, when the two transmit parties are located in proximity. For example, if two parties are transmitting voice from the same social gathering, they are sharing the ambient noise environment. In fact, a target voice may be another's ambient noise. If the call server is aware of the situation, the server can take advantage of one call's SSA to perform better enhancement in the other call. In today's consumer gadget deployment, one can use global positioning satellite (GPS) to locate whether the two transmit hosts are in physical proximity. In the example of FIG. 14, the transmit host 141 is collocated in the proximity of the second transmit host 143. A special application running in the cloud, 145, is aware of this collocation, which takes advantage of the ambient noise estimates from both to present a better output signal to the receive host 149 and the receive host 148.

Figure 15:
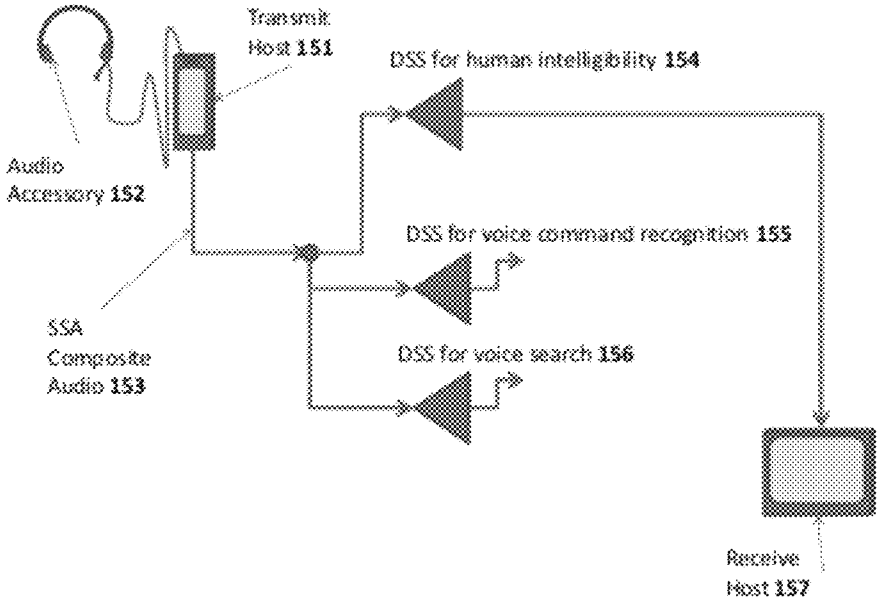
FIG. 15 depicts the notion the DSS processing may be specialized for different applications in accordance with one embodiment.
Figure 16:
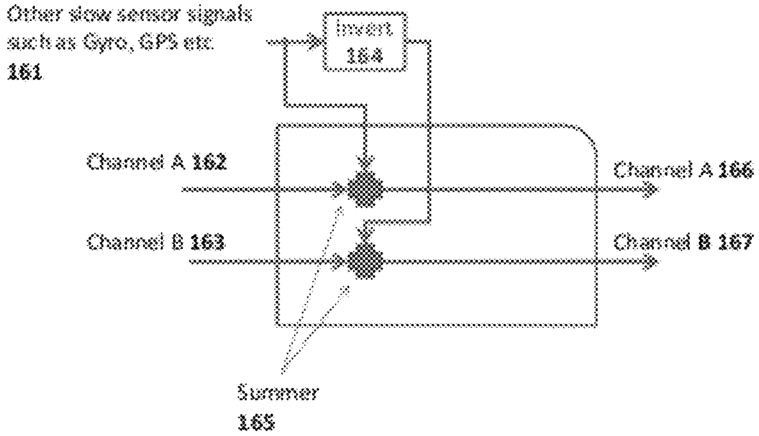
FIG. 16 shows how a slowly varying sensor signal may be multiplexed into a SSA signal in accordance with one embodiment.

The DSS signal processing requirement is different for different applications. While speech recognition is better off with silence insertion between speech segments, the discontinuity caused by the silence insertion is extremely annoying to human listener. Also, the quality of left over ambient noise is extremely important for human listening. Unlike speech recognition or voice search, voice command recognition is typically much more robust in the presence of ambient noise, hence it does not require as much processing. In another embodiment, as shown in FIG. 15, the SSA signal representation allows different applications to perform the necessary level and type of DSS signal processing. On one instance of an SSA signal 153, the DSS 154 is optimized for human intelligibility, DSS 155 is optimized for command recognition and the DSS 156 is optimized for voice search.

In another embodiment, a slowly varying (voice-band compatible) non-voice signal 161 is mixed into the Channel A 162 of the SSA composite, and it's inversion 164 is mixed into the Channel B 163, to generate a new SSA (166,167) be carried end-to-end. It is best to modulate these signals into the higher bands of the wide-band voice, so it has the least interference with voice. The said slowly varying signal is not audible to the listener, since it is suppressed by the DSS process for voice enhancement. The slow non-voice sensor signal may be GPS, Gyro, temperature, barometer, accelerometer, illumination, gaming controller, etc.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The embodiments also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations The invention can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for network transmission of voice, comprising:

combining two digital audio signals into a composite source separable audio (SSA) signal, each digital audio signal of the two digital audio signals representing an independent mixture of a target source voice and an ambient noise, wherein outputs of the plurality of microphones within the first group are summed together as a first output and the outputs of the plurality of microphones within the second group are summed together as a second output, thereby defining a first virtual microphone and a second virtual microphone, respectively, and wherein the combining process comprises interleaving the two audio signals to generate the composite SSA signal.

2. A method of claim 1, further comprising:

separating the two audio signals within the composite SSA signal into two mono audio signals by performing directed source separation (DSS).

3. A method of claim 1, wherein the two audio signals are analog signals and the combining process comprises delaying the second audio signal and summing the delayed second audio signal with the first audio signal to generate the composite SSA signal.

4. A method of claim 1, wherein the composite SSA signal is intelligible for human listening without requiring any further processing.

5. A method of claim 2, comprising:

performing a first ambient sound separation process for human listening intelligibility; and performing a second ambient sound separation process for a machine voice application.

6. A method of claim 1, wherein a quality of ambient sound separation is traded off gracefully, depending on the availability of processing power.

7. A method of claim 1, wherein the separating is performed in an intermediate server in a network cloud.

* * * * *